Jan. 22, 1957  R. F. THORNTON  2,778,246
DIFFERENTIAL TRANSMISSION
Filed Jan. 28, 1952  4 Sheets-Sheet 1

INVENTOR.
RAY F. THORNTON
BY
*Arthur M. Smith*
ATTORNEY

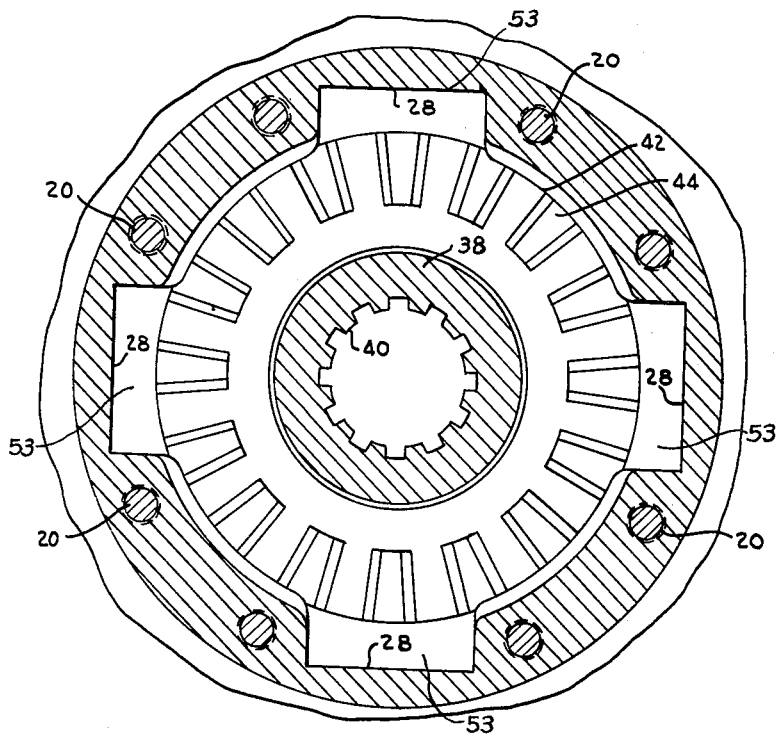
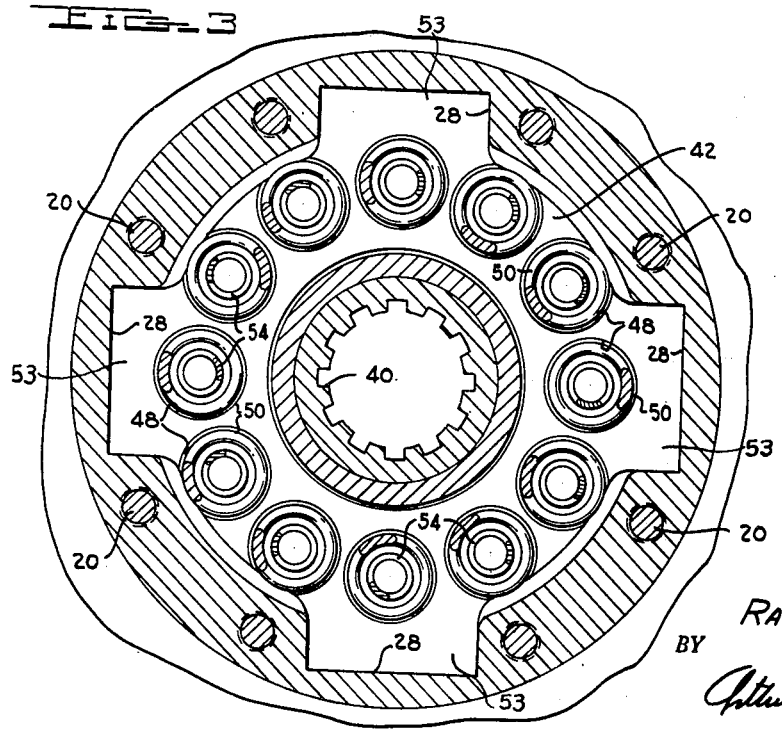

Jan. 22, 1957  R. F. THORNTON  2,778,246
DIFFERENTIAL TRANSMISSION
Filed Jan. 28, 1952  4 Sheets-Sheet 3

INVENTOR.
RAY F. THORNTON
BY
Arthur M. Smith
ATTORNEY

Jan. 22, 1957  R. F. THORNTON  2,778,246
DIFFERENTIAL TRANSMISSION
Filed Jan. 28, 1952  4 Sheets-Sheet 4
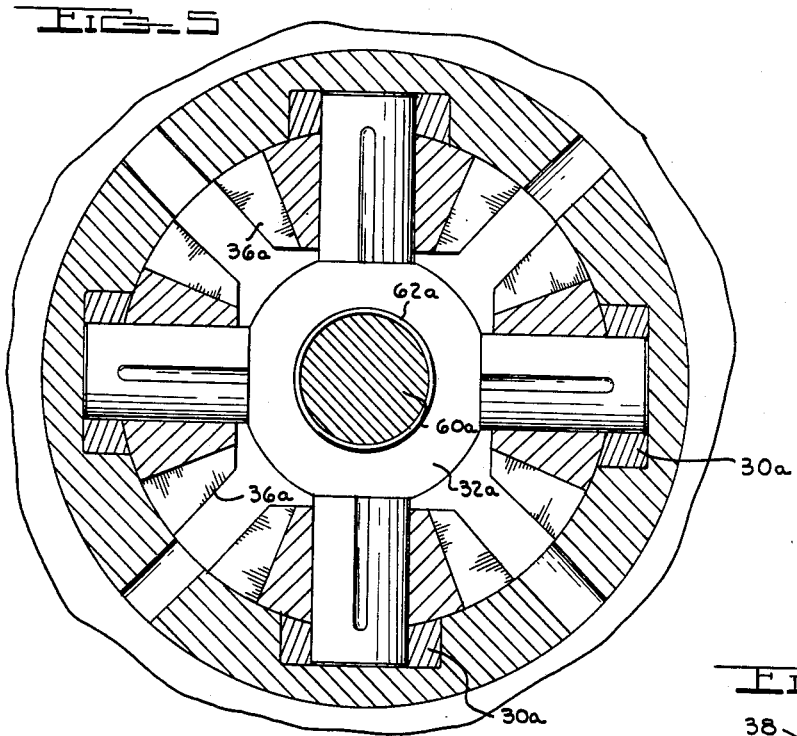
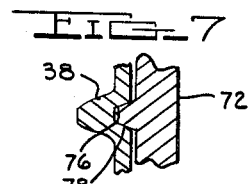
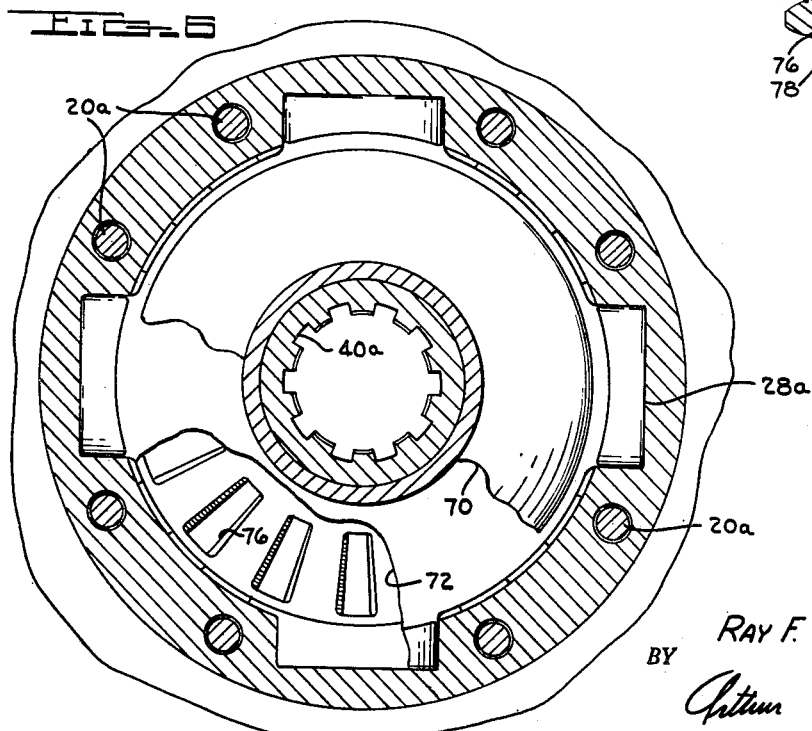
INVENTOR.
RAY F. THORNTON
BY
*Arthur M. Smith*
ATTORNEY United States Patent Office 2,778,246
Patented Jan. 22, 1957

2,778,246

DIFFERENTIAL TRANSMISSION

Ray F. Thornton, Dexter, Mich., assignor of one-sixth to Irving Grant, one-sixth to B. L. Diamond, and one-half to J. M. R. Lyeth, Jr., Detroit, Mich.

Application January 28, 1952, Serial No. 268,473

12 Claims. (Cl. 74—711)

This invention relates to a differential transmission unit and more particularly to such a unit which is used in the driving axle of an automobile for the purpose of permitting rotation of one of the driving wheels relative to the other. This invention relates to differential transmission devices of the type disclosed in my co-pending application, Serial No. 244,611, filed August 31, 1951. The present invention is also well adapted for use with any drive shaft construction where it is desired to provide a partial locking of one shaft with respect to another.

As was explained in my aforesaid application, when one of the rear or driving wheels of a motor vehicle having a conventional differential transmission loses traction and begins to spin, the other rear or driving wheel remains stationary, if it has traction, and does not operate to move the vehicle. Because of this condition, a motor vehicle is completely immobilized if only one of the driving wheels loses traction, as so frequently occurs when driving on wet, slippery or muddy surfaces.

This condition creates a serious problem, particularly among military vehicles which may be required to travel over fields and roads which are in such condition that relatively poor traction is provided for the wheels. As is quite obvious, the differential can be eliminated, but a vehicle so constructed would have difficulty making sharp turns and under certain circumstances, the drive axle would be placed under such stresses and strains that it would ultimately be broken.

It is an object of the present invention to provide a differential transmission for a motor vehicle, which transmission is constructed and arranged so that the drive axle acts as a solid axle when the vehicle is moving over areas where poor traction is provided, and which is constructed and arranged to permit differential movement of one drive wheel relative to the other when a predetermined differential load is applied to said wheels.

It is another object of the present invention to provide a differential transmission of the foregoing character wherein a pair of opposed clutch mechanisms are operatively disposed between the gear train and the rotatable case of the gear train for effecting the locking action of the differential transmission, and wherein a floating spider for carrying the pinions is provided by which the load between the opposed clutches will always be balanced.

Still another object of the present invention is to provide means in the gear train for maintaining the differential gears in proper meshed relation with respect to the idling gears so that such gears will not be damaged from being biased together by the aforesaid clutch mechanisms.

It is still another object of the present invention to provide a differential transmission of the foregoing character in which the clutch plates of the aforesaid clutch mechanisms and the differential gears are constructed and arranged so that they can either be forged or machined to shape, whereby the manufacturing costs may be reduced to a minimum.

Still another object of the present invention is to provide a partially locking differential transmission which can be economically produced and installed in a motor vehicle and which will permit normal operation of the motor vehicle in the event the locking mechanisms become defective.

Other objects of this invention will appear in the following description and appended claims, reference being had to the accompanying drawings forming a part of this specification wherein like reference characters designate corresponding parts in the several views.

In the drawings:

Fig. 2 is a section taken on the line 2—2 of Fig. 1 showing one side of the clutch plate;

Fig. 3 is a section taken on the line 3—3 of Fig. 1 showing the other side of the clutch plate;

Fig. 5 is a section taken on the line 5—5 of Fig. 4 showing the spider arrangement for mounting the idling gears;

Fig. 6 is another section taken on the line 6—6 of Fig. 4 with portions of the saucer spring and clutch disc being broken away to show the side gear of the differential transmission; and Fig. 7 is a fragmentary sectional view taken on the line 7—7 of Fig. 4.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
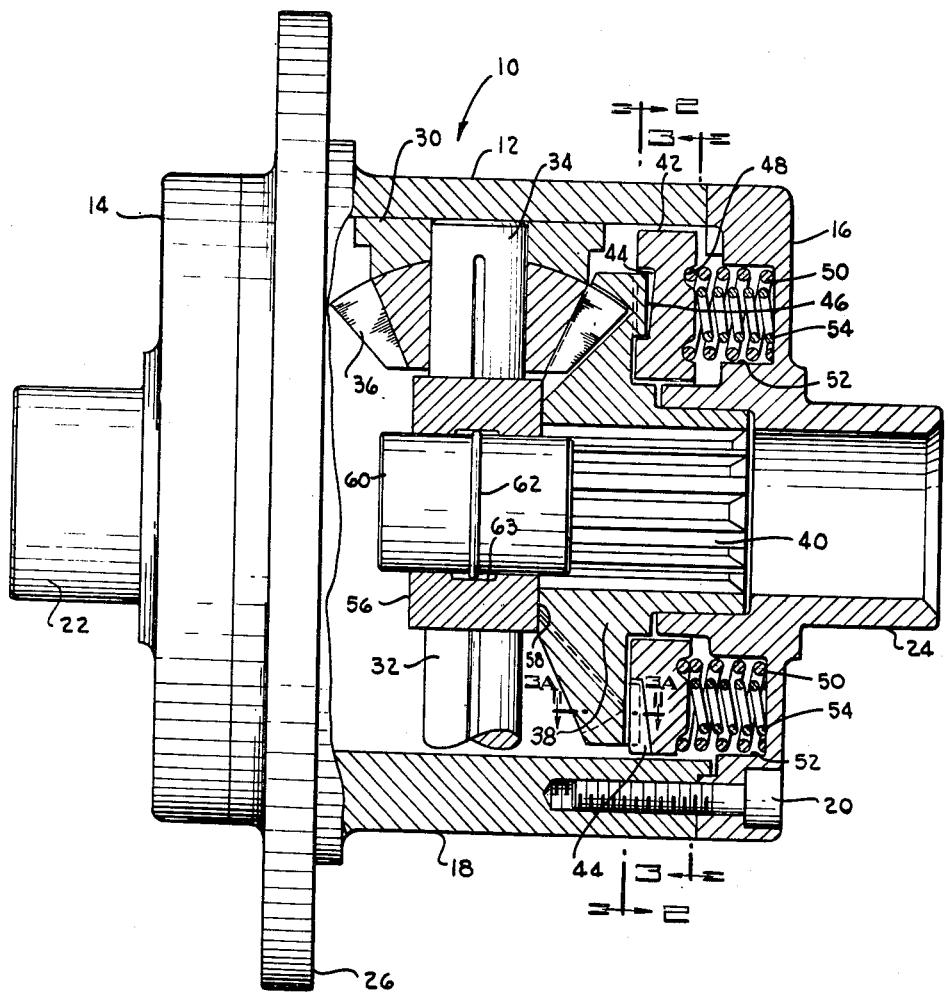
Fig. 1 is a front elevation of the differential transmission partly in section with one differential gear and one idling gear of the gear train removed.
Figure 3A:
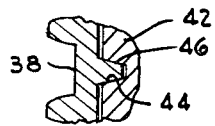
Fig. 3A is a fragmentary section taken on the line 3A—3A of Fig. 1.
Figure 4:
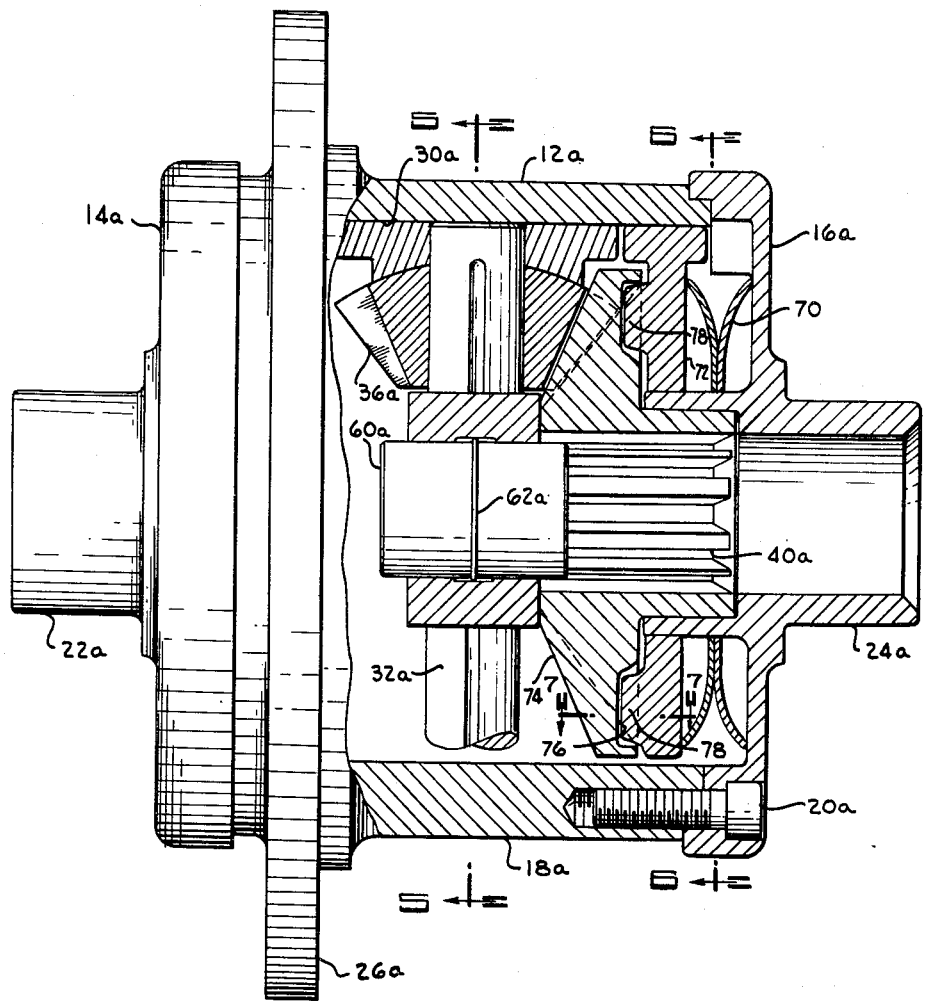
Fig. 4 is a front elevation similar to Fig. 1 showing a modified form of clutch mechanism.

Two embodiments of the present invention are illustrated in the drawings, the first being illustrated in Figs. 1 to 3 to which reference is now made. The differential transmission 10 includes a housing or case 12 which is adapted to revolve in the conventional manner and which is formed with two cover plates 14 and 16 closing the ends of the cylindrical portion 18. The cover plates 14 and 16 are secured to the cylindrical portion 18 by a plurality of bolts as shown at 20.

Each of the cover plates 14 and 16 has a hub portion 22 and 24 respectively, which is adapted to receive an axle shaft (not shown) and the cylindrical portion 18 has an annular flange 26 to which a conventional driving ring gear (not shown) may be secured.

The cylindrical portion 18 has four longitudinal slots 28 extending throughout its length into which four spider blocks 30 are seated, each being adapted to receive the end of an arm of the spider 32 as is shown at 34. As can be readily understood, by virtue of this arrangement the spider 32 will be held from rotation with respect to the cylindrical portion 18, but it can be easily removed from or inserted into the cylindrical portion 18 merely by having one of the cover plates 14 or 16 removed and thereafter sliding the spider 32 with the blocks 30 mounted in place on the ends of the arms longitudinally of the cylindrical portion 18. The blocks 30 also serve as thrust bearings from the pinion gears 36 which are mounted one each on each of the arms of spider 32.

Meshed with the pinion gears 36 are two differential gears 38, one of which is shown in Fig. 1. The differential gears 38 are oppositely disposed and coaxially aligned within the case 12 and have internal splines 40 into which the splined ends of axle shafts (not shown) can be inserted.

As is understood by those skilled in the art, a differential transmission which contained no more than what is described above would permit one of the drive wheels to spin relative to the other if said one wheel lost traction, and this in turn would result in the other driving wheel remaining idle so that the vehicle would be immobile.

In order to overcome this condition, a clutch mechanism is provided to effect a semi-locking of the differential transmission 10 so that the respective drive or axle shafts (not shown) will not rotate relative to one another unless a predetermined differential torque is applied on said shafts. If desired, the present invention can be constructed and arranged so that the differential torque of the required magnitude will be produced on said axle shafts, for example, when a motor vehicle is turned on a dry pavement or the like where one wheel must make a greater number of rotations in completing the turn than the other. For the purpose of this application, a clutch mechanism is shown and described with respect to only one differential gear, but it is to be understood that the differential transmission is symmetrically arranged with a clutch mechanism on the outer side of both differential gears 38.

The clutch mechanism of this embodiment of the invention includes an annular clutch plate or traction disc 42 which has a plurality of radially disposed depressions or slots 44 on its one side which are adapted to mate with corresponding projections 46 formed on the outer face of the associated differential gear 38. The projections 46 have radially beveled sides and the slots 44 have corresponding radially beveled sides for a purpose to be explained hereinafter. The relationship of these elements can be seen in cross section in Fig. 3A. The other side of the clutch plate 42 has a plurality of circular seats 48 in which ends of the compression springs 50 are received and held in place when the cover plate 14 or 16 is mounted in place.

Each of the cover plates 14 and 16 has cylindrical recesses 52 on its inner surface for receiving the opposite ends of compression springs 50. Thus, when cover plates 14 and 16 are secured in place the compression springs 50 will exert a predetermined pressure against the clutch plates 42 tending to hold the clutch plates 42 in engagement with their associated differential gears 38 so that relative rotation between these associated parts will be prevented.

As can be seen in Figs. 2 and 3, each clutch plate 42 has four lugs 53 which project into the longitudinal slots 28 of the case 18 thereby locking the clutch plate 42 against rotation, but permitting ready installation or removal of the same when the cover plate 14 or 16 is removed. By virtue of the construction and arrangement of the clutch mechanism, the differential gear 38 will be held against rotation except when sufficient differential torque is applied to the drive or axle shafts. When this occurs the clutch plates 42 will be forced longitudinally outwardly because of the beveled characteristics of the sides of the slots 44 and projections 46 thereby permitting slipping of the clutch mechanism and relative rotation of one shaft with respect to the other.

It may be necessary under certain circumstances to employ springs of greater or lesser compressive characteristics, thereby changing the magnitude of the differential torque necessary to permit relative rotation of the drive or axle shafts. This can be accomplished by substituting for springs 50 another set of springs having the necessary spring characteristics. If desired, a second set of springs 54 may be inserted inside the springs 50 for increasing the pressure exerted on the clutch plate 42. It should be understood that any such arrangement is contemplated for use in providing the necessary and desired spring pressure. Springs most desirable for use are those having such characteristics that the clutch mechanisms will prevent the engine of the motor vehicle from spinning one wheel relative to the other while proceeding on a straight course, and simultaneously will allow one wheel to rotate relative to the other when the vehicle is making a turn.

Cover plates 14 and 16 restrain side gears 38 from being forced outwardly by the pinion gears 36. Under certain circumstances the clutch thrust will press the gears together and therefore, it is necessary to space the differential gears 38 apart a predetermined distance so as to limit the inward axial movement of such gears. This is effected by the shoulder 56 on the spider 32 against which the differential gears 38 make a bearing contact as at 58.

In order that the axle shafts (not shown) are properly spaced apart a spacing member 60 may be inserted into the spider 32 and retained in place therein by the spring clip 62. A slot 63 extends around the inner periphery of the spider 32 and it is wider than the spring clip 62 so that limited relative movement between the spacing member 60 and spider 32 is permitted. By virtue of this arrangement the pressure exerted between the pinion gears 36 and each of the differential gears 38 will always be equal. This will be understood when it is considered that the spider 32 can move axially of the housing or case 12 because of the manner previously described in which the spider 32 is mounted in the longitudinally movable spider blocks 30. Thus, in the event the springs of the clutch mechanism acting on one differential gear exert a greater pressure than those of the opposite clutch mechanism acting on the other differential gear, the floating spider 32 will be able to slide a limited amount on the spacing member 60 so as to equalize the spring pressures exerted by the respective clutch mechanisms.

The second embodiment of my invention is shown in Figs. 4 to 7 wherein reference numbers followed by the letter "a" correspond to like numbers used in Figs. 1 to 3. This embodiment utilizes a different clutch mechanism from the one previously described. In the modification of Figs. 4 to 7 a conical disc spring 70 is employed between the clutch plates 72 (only one of which is shown) and the cover plates 14a and 16a for compressing the clutch plates 72 against the differential gears 74 (only one being shown). Also, the differential gears 74 have depressions 76 formed in their outer surfaces while the projections 78 are formed on the inner side of the clutch disc 72.

In Fig. 7 a cross section of one of the projections 78 with its associated depression 76 is shown. The same general shapes are also utilized in the first embodiment described above of the invention and which can be seen in Fig. 3A. In each instance sixteen projections and associated depressions are employed with the included angle of the sidewalls being approximately 75°.

Each of these differential transmissions is characterized by its quiet operation and its relatively low cost of manufacture and maintenance. The lubricant inlets (not shown) permit the case 12 or 12a to be filled with a suitable lubricant and the axial movements of the clutch plates will work the lubricant back and forth around the various meshing parts, thereby providing relatively noiseless operation.

The construction and arrangement of the component parts of the differential transmission units are such that they can be forged or machined to shape so that the most economical manufacturing operation may be utilized. When forging the gears, clutch plates, and the like, it is only necessary to coin the gear teeth and other meshing parts. Grinding will be required on the bearing fits and gear hubs.

Assembly of these units and any maintenance work required thereon may be carried out in a relatively simple manner because of the construction of the case 12 or 12a. As can be understood, access into the differential transmission is gained merely by removing the bolts from one of the cover plates and sliding the latter axially away from the remainder of the case. Thus, it can be seen that an efficient, simple unit has been provided which will effect the desired semi-locking of the drive or axle shafts, one to the other.

A very desirable feature of the present invention is that the conventional operation of the differential transmission will not be affected by failure or weakening of any of the springs of the clutch mechanisms. Further, if the springs in one of the clutch mechanisms should be weakened for any reason, the floating characteristics of the spider 32 will cause a balancing of the pressures exerted by each of the clutch mechanisms on its associated differential gear. Thus, equal torque distribution from the drive shaft to the driven shafts is always provided whether the clutch mechanisms are operating properly or not.

Having thus described my invention, I claim:

1. In a differential transmission unit, the combination of a rotatable gear case, a power transmission gear train operatively positioned within said case, and clutch means operatively disposed between said gear train and said gear case for opposing relative rotative movement of members of said gear train, said clutch means including a clutch plate mounted against rotation in said case and adapted to engage one of the gears of said gear train, and spring means in engagement with said case to bias said plate against said one gear.

2. In a differential transmission unit, the combination of a rotatable gear case, a power transmission gear train operatively positioned within said case, said gear train including a pair of oppositely disposed differential gears adapted for receiving axle shafts and each having a plurality of projections formed on surfaces thereof in coaxial relation with respect to said axle shafts, axially shiftable annular clutch disks mounted in said case to rotate at all times with said case coaxially of said axle shafts, said clutch disks having depressions on their surfaces for receiving said projections so as to resist rotation of said differential gears with respect to said case, and yieldable means in said case acting to shift said discs axially relative to said case for biasing said clutch disks toward said differential gears.

3. In a differential transmission unit, the combination claimed in claim 2 wherein said spring means comprise a plurality of coil springs mounted between said case and said clutch discs.

4. In a differential transmission unit, the combination of a rotatable gear case, a power transmission gear train operatively positioned within said case, said gear train including a pair of oppositely disposed differential gears adapted for receiving axle shafts, a pair of axially shiftable annular clutch discs mounted in said case to rotate at all times with said case on opposite sides of said differential gears and coaxially of said axle shafts, each of said differential gears and its associated clutch disc being in mating relationship, one having projections and the other having recesses for receiving such projections, and yieldable means acting to shift said discs axially relative to said case for biasing said clutch discs and differential gears into mating relationship.

5. In a differential transmission unit, the combination claimed in claim 4 wherein said spring means comprises a pair of conical disc springs mounted in compression between said case and each of said clutch discs.

6. In a differential transmission unit, the combination claimed in claim 4 wherein said spring means comprises a plurality of coil springs mounted in compression between said case and each of said clutch discs.

7. In a differential transmission unit, the combination of a rotatable gear case, a power transmission gear train operatively positioned within said case, said gear train including a pair of oppositely disposed differential gears adapted for receiving axle shafts, a pair of annular clutch disks mounted in said case on opposite sides of said differential gears and coaxially of said axle shafts, each of said clutch disks having a plurality of radially extending legs, said case having slots formed therein for receiving said legs to permit axial movement of said clutch disks into engagement with said differential gears to oppose rotation thereof, and spring means mounted in said case to bias said clutch disks into engagement with said differential gears.

8. In a differential transmission unit, the combination of a rotatable gear case, a power transmission gear train operatively positioned within said case, said gear train including a pair of oppositely disposed differential gears adapted for receiving axle shafts, a pair of annular clutch discs mounted against rotation in said case on opposite sides of said differential gears and coaxially of said axle shafts, each of said differential gears and its associated clutch disc being in mating relationship, one having projections and the other having depressions for receiving such projections and spring means for biasing said clutch discs and differential gears into mating relationship, said gear case having a pair of removable cover plates through which said axle shafts are adapted to extend and against which said spring means are mounted.

9. A traction-maintaining differential transmission unit which comprises the combination of a rotatable gear case having a plurality of axially extending slots in the inner surface of the case, a power transmission gear train operatively positioned within said case, including a spider assembly having a plurality of radial projections, mounting blocks for said projections slidable in said slots of said gear case, pinion gears on said radial projections inside of said blocks, a pair of oppositely disposed differential gears engaged with said pinion gears adapted to receive axial shafts, a pair of floating annular traction disks mounted in said case on opposite sides of said differential gears and co-axially thereof, each of said disks having a plurality of radial projections extending into the slots of said case, and a plurality of interengaging depressions and projections on said traction disks and said differential gears shaped to create traction therebetween and to cause axial camming of said traction disks temporarily out of engagement with said differential gears at a predetermined torque relationship to permit differential motion of said gears, and means biasing said traction disks into engagement with said differential gears.

10. In a differential transmission unit, the combination of a rotatable gear case, a power transmission gear train operatively positioned within said case, said gear train including a pair of oppositely disposed differential gears adapted for receiving axle shafts, a pair of axially shiftable annular clutch discs mounted in said case to rotate at all times with said case on opposite sides of said differential gears and coaxially of said axle shafts, each of said differential gears and its associated clutch disc being in mating relationship, one having projections and the other having recesses for receiving such projections, and yieldable means acting to shift said discs axially relative said case for biasing said clutch discs and differential gears into mating relationship, said gear train having a floating mounting to effect equal pressures being exerted thereon by said clutch discs.

11. In a differential transmission unit, the combination of a rotatable gear case, a power transmission gear train operatively positioned within said case, said gear train including a pair of oppositely disposed differential gears adapted for receiving axle shafts and each having a plurality of depressions formed thereon in a coaxial relation with respect to said axle shafts, annular clutch discs mounted against rotation in said case coaxially of said axle shafts, said clutch discs having projections for penetrating said depressions to permit limited rotation of said differential gears and spring means for biasing said clutch discs into engagement with said differential gears, said spring means comprising conical disc springs mounted between said case and said clutch discs.

12. In a differential transmission unit, the combination of a rotatable gear case, a power transmission gear train operatively positioned within said case, and clutch means within said case operatively disposed between said gear train and said gear case for opposing relative movement of members of said gear train, said clutch means including formed radial surfaces on the outsides of a pair of oppositely disposed differential gears in said gear train to provide relatively closely spaced alternate raised and depressed portions, axially movable means mounted within and to rotate with said case between said gears and the inner wall of said case to interengage said formed radial surfaces, and spring means in engagement with said case releasably to bias said axially movable means toward the formed surfaces of said gears.

References Cited in the file of this patent

UNITED STATES PATENTS

| | | |
|---|---|---|
| 1,292,818 | Lewis | Jan. 28, 1919 |
| 1,324,859 | Taylor | Dec. 16, 1919 |
| 1,344,107 | Wilkin | June 22, 1920 |
| 1,481,889 | Carhart | Jan. 29, 1924 |
| 1,529,804 | Nogrady | Mar. 17, 1925 |
| 1,556,101 | Goodhart | Oct. 6, 1925 |
| 1,677,682 | Ortt | July 17, 1928 |
| 1,750,981 | Wildhaber | Mar. 18, 1930 |
| 1,883,725 | Guilmette | Oct. 18, 1932 |
| 1,979,414 | Smith | Nov. 6, 1934 |
| 2,234,591 | Fitzner | Mar. 11, 1941 |
| 2,354,214 | Lockwood | July 25, 1944 |

FOREIGN PATENTS

| | | |
|---|---|---|
| 499,048 | Great Britain | Jan. 18, 1939 |